United States Patent
Tekavec et al.

(10) Patent No.: US 10,139,701 B2
(45) Date of Patent: Nov. 27, 2018

(54) OPTICAL PARAMETRIC OSCILLATOR FOR GENERATING TERAHERTZ RADIATION

(71) Applicant: Microtech Instruments, Inc., Eugene, OR (US)

(72) Inventors: Patrick F. Tekavec, Eugene, OR (US); Vladimir G. Kozlov, Eugene, OR (US)

(73) Assignee: MICROTECH INSTRUMENTS, INC, Eugene, OR (US)

( * ) Notice: Subject to any disclaimer, the term of this patent is extended or adjusted under 35 U.S.C. 154(b) by 72 days.

(21) Appl. No.: 15/364,212

(22) Filed: Nov. 29, 2016

(65) Prior Publication Data

US 2018/0101085 A1    Apr. 12, 2018

Related U.S. Application Data

(60) Provisional application No. 62/269,484, filed on Dec. 18, 2015.

(51) Int. Cl.
  *G02F 1/35*   (2006.01)
  *G02F 1/39*   (2006.01)

(52) U.S. Cl.
  CPC ............. *G02F 1/3532* (2013.01); *G02F 1/39* (2013.01)

(58) Field of Classification Search
  CPC .................... G02F 1/3532; G02F 1/39
  See application file for complete search history.

(56) References Cited

U.S. PATENT DOCUMENTS

| | | | |
|---|---|---|---|
| 5,017,806 A | 5/1991 | Edelstein et al. | |
| 5,212,698 A | 5/1993 | Kafka et al. | |
| 5,365,366 A | 11/1994 | Kafka et al. | |
| 5,371,752 A | 12/1994 | Powers et al. | |
| 5,377,043 A | 12/1994 | Pelouch et al. | |
| 5,406,408 A | 4/1995 | Ellingson et al. | |
| 5,847,861 A | 12/1998 | Kafka et al. | |
| 6,282,014 B1 | 8/2001 | Long et al. | |
| 7,272,158 B1 | 9/2007 | Hayes et al. | |
| 7,339,718 B1 | 3/2008 | Vodopyanov et al. | |
| 7,349,609 B1 | 3/2008 | Vodopyanov et al. | |
| 7,616,304 B2 | 11/2009 | Gankkhanov et al. | |
| 7,995,628 B2 * | 8/2011 | Wu ........................ | H01S 1/02 372/21 |
| 8,482,738 B2 | 7/2013 | Rimke et al. | |
| 8,599,474 B1 | 12/2013 | Kozlov et al. | |
| 8,599,475 B1 | 12/2013 | Kozlov et al. | |

(Continued)

FOREIGN PATENT DOCUMENTS

WO   WO 2007/132229   11/2007
WO   WO 2008/135257   11/2008

OTHER PUBLICATIONS

International Search Report dated Feb. 24, 2017.
(Continued)

*Primary Examiner* — Daniel Petkovsek
(74) *Attorney, Agent, or Firm* — David S. Alavi

(57) ABSTRACT

An optical parameter oscillator (OPO) is pumped at pump wavelength $\lambda_P$ to resonate at signal wavelength $\lambda_S$. The OPO produces idler radiation at terahertz frequencies $\nu_{THz} = c/\lambda_P - c/\lambda_S$. The pump, signal, and idler radiation are substantially collinear.

21 Claims, 3 Drawing Sheets

(56) References Cited

U.S. PATENT DOCUMENTS

| | | |
|---|---|---|
| 8,599,476 B1 | 12/2013 | Kozlov et al. |
| 9,377,362 B2 | 6/2016 | Kozlov et al. |
| 9,574,944 B1 | 2/2017 | Kozlov et al. |
| 2005/0213194 A1* | 9/2005 | Kim ............... G02F 1/3534 359/328 |
| 2008/0037595 A1 | 2/2008 | Gankkhanov et al. |
| 2014/0063591 A1* | 3/2014 | Hu ................. G02F 1/3534 359/330 |
| 2015/0153234 A1 | 6/2015 | Kozlov et al. |
| 2015/0194780 A1 | 7/2015 | Caprara et al. |

OTHER PUBLICATIONS

Kiev et al; "High-power picoseconds fiber source for coherent Raman spectroscopy"; Optics Letters vol. 34 p. 2051 (2009).

Saar et al; "Intracavity wavelength modulation of an optical parametric oscillator for coherent Raman microscopy"; Optics Express vol. 17 p. 12532 (2009).

Schaar et al; "Intracavity terahertz-wave generation in a synchronously pumped optical parametric oscillator using quasi-phase-matched GaAs"; Optics Letters v 32 p. 1284 (2007).

Lee et al; "Generation of multicycle terahertz pulses via optical rectification in periodically inverted GaAs structures"; Applied Physics Letters vol. 89 p. 181104 (2006).

Imai et al; "A frequency-agile terahertz-wave parametric oscillator"; Optics Express vol. 8, No. 13, p. 699 (2001).

Taniuchi et al; "Collinear phase-matched terahertz-wave generation in GaP crystal using . . . "; Journal of Applied Physics vol. 95, No. 12, p. 7588 (2004).

Sowade et al; "Continuous-wave optical parametric terahertz source"; Optics Express vol. 17, No. 25, p. 22303 (2009).

Sowade; "Continuous-wave terahertz light from optical parametric oscillators"; doctoral dissertation, University of Bonn (2010).

Petersen et al; "Enhanced terahertz source based on external cavity difference-frequency generation using . . ."; Optics Letters vol. 35, No. 13, p. 2170 (2010).

Xu et al; "High Energy Terahertz Parametric Oscillator Based on Surface-Emitted Configuration"; Chinese Physics Letters vol. 30, No. 2, p. 024212 (2013).

Li et al; "Investigation on terahertz parametric oscillators using GaP crystal with a noncollinear phase-matching scheme"; Journal of Modern Optics v 62, n 4, p. 302 (2015).

Vodopyanov et al; "Resonantly-enhanced THz-wave generation via multispectral mixing inside a ring-cavity optical parametric oscillator"; Conference on Lasers and Electro-Optics/International Quantum Electronics Conference, OSA Technical Digest (Optical Society of America, 2009), CLEO paper CTuG1.

Kokabee et al; "Efficient, high-power, 16-GHz, picosecond optical parametric oscillator pumped by an 81-MHz fiber laser"; Conference on Lasers and Electro-Optics/International Quantum Electronics Conference, OSA Technical Digest (Optical Society of America, 2010); CLEO paper CThP2.

Hurlbut et al; "THz-waves Difference Frequency Generation of inside a high-finesse ring-cavity OPO pumped by a fiber laser"; Conference on Lasers and Electro-Optics/International Quantum Electronics Conference, OSA Technical Digest (Optical Society of America, 2010), CLEO paper CWF3.

Creeden et al., "Compact, high average power, fiber-pumped terahertz source for active real-time imaging of concealed objects", Optics Express vol. 15, No. 10, p. 6478 (2007).

* cited by examiner

OPTICAL PARAMETRIC OSCILLATOR FOR GENERATING TERAHERTZ RADIATION

BENEFIT CLAIMS TO RELATED APPLICATIONS

This application claims benefit of U.S. provisional App. No. 62/269,484 filed Dec. 18, 2015 in the names of Patrick F. Tekavec and Vladimir G. Kozlov, said provisional application being hereby incorporated by reference as if fully set forth herein.

FIELD OF THE INVENTION

The field of the present invention relates to generation of terahertz radiation. In particular, apparatus and methods are described herein that employ an optical parametric oscillator to generate terahertz radiation.

BACKGROUND

Various apparatus and methods exist that employ an optical parametric oscillator (OPO), in some cases to generate terahertz radiation (having frequencies from about 0.3 THz to about 10 THz). Some examples are described in:

U.S. Pat. No. 5,017,806 entitled "Broadly tunable high repetition rate femtosecond optical parametric oscillator" issued May 21, 1991 to Edelstein et al;

U.S. Pat. No. 5,212,698 entitled "Dispersion compensation for ultrashort pulse generation in tuneable lasers" issued May 18, 1993 to Kafka et al;

U.S. Pat. No. 5,365,366 entitled "Synchronously pumped sub-picosecond optical parametric oscillator" issued Nov. 15, 1994 to Kafka et al;

U.S. Pat. No. 5,371,752 entitled "Optical parametric oscillation using KTA nonlinear crystals" issued Dec. 6, 1994 to Powers et al;

U.S. Pat. No. 5,377,043 entitled "Ti:sapphire-pumped high repetition rate femtosecond optical parametric oscillator" issued Dec. 27, 1994 to Pelouch et al;

U.S. Pat. No. 5,406,408 entitled "Intracavity-doubled tunable optical parametric oscillator" issued Apr. 11, 1995 to Ellingson et al;

U.S. Pat. No. 5,847,861 entitled "Synchronously pumped sub-picosecond optical parametric oscillator" issued Dec. 8, 1998 to Kafka et al;

U.S. Pat. No. 6,282,014 entitled "Cascade optical parametric oscillator for down-conversion" issued Aug. 28, 2001 to Long et al;

U.S. Pat. No. 7,272,158 entitled "Highly efficient waveguide pulsed THz electromagnetic radiation source and group-matched waveguide THz electromagnetic radiation source" issued Sep. 18, 2007 to Hayes et al;

U.S. Pat. No. 7,339,718 entitled "Generation of terahertz radiation in orientation-patterned semiconductors" issued Mar. 4, 2008 to Vodopyanov et al;

U.S. Pat. No. 7,349,609 entitled "Terahertz radiation generation and methods therefor" issued Mar. 25, 2008 to Vodopyanov et al;

U.S. Pat. No. 7,616,304 entitled "System and method for providing a tunable optical parametric oscillator laser system that provides dual frequency output for non-linear vibrational spectroscopy and microscopy" issued Nov. 10, 2009 to Gankkhanov et al;

U.S. Pat. No. 8,599,474 entitled "Alignment and optimization of a synchronously pumped optical parametric oscillator for nonlinear optical generation" issued Dec. 3, 2013 to Kozlov et al;

U.S. Pat. No. 8,599,475 entitled "Generation of terahertz radiation in orientation-patterned semiconductors" issued Dec. 3, 2013 to Kozlov et al;

U.S. Pat. No. 8,599,476 entitled "Generation of terahertz radiation in orientation-patterned semiconductors" issued Dec. 3, 2013 to Kozlov et al;

U.S. Pub. No. US 2008/0037595 entitled "System and method for providing a tunable optical parametric oscillator laser system that provides dual frequency output for non-linear vibrational spectroscopy and microscopy" published Feb. 14, 2008 in the names of Gankkhanov et al;

Pub. No. WO 2007/132229 entitled "Optical parametric oscillator" published Nov. 22, 2007 in the names of Ebrahim-Zadeh et al;

Pub. No. WO 2008/135257 entitled "Method and optical arrangement for generating a nonlinear optical signal on a material which is excited by an excitation field, and use of the method and of the optical arrangement" published Nov. 13, 2008 in the names of Rimke et al;

Kieu et al; "High-power picoseconds fiber source for coherent Raman spectroscopy"; Optics Letters Vol 34 p 2051 (2009);

Saar et al; "Intracavity wavelength modulation of an optical parametric oscillator for coherent Raman microscopy"; Optics Express vol 17 p 12532 (2009);

Schaar et al; "Intracavity terahertz-wave generation in a synchronously pumped optical parametric oscillator using quasi-phase-matched GaAs"; Optics Letters vol 32 p 1284 (2007);

Lee et al; "Generation of multicycle terahertz pulses via optical rectification in periodically inverted GaAs structures"; Applied Physics Letters vol 89 p 181104 (2006);

Imai et al; "A frequency-agile terahertz-wave parametric oscillator"; Optics Express Vol. 8, No. 13, p. 699 (2001);

Taniuchi et al; "Collinear phase-matched terahertz-wave generation in GaP crystal using a dual-wavelength optical parametric oscillator"; Journal of Applied Physics Vol. 95, No. 12, p. 7588 (2004);

Sowade et al; "Continuous-wave optical parametric terahertz source"; Optics Express Vol. 17, No. 25, p. 22303 (2009);

Sowade; "Continuous-wave terahertz light from optical parametric oscillators"; doctoral dissertation, University of Bonn (2010);

Petersen et al; "Enhanced terahertz source based on external cavity difference-frequency generation using monolithic single-frequency pulsed fiber lasers"; Optics Letters Vol. 35, No. 13, p. 2170 (2010);

Xu et al; "High Energy Terahertz Parametric Oscillator Based on Surface-Emitted Configuration"; Chinese Physics Letters Vol. 30, No. 2, p. 024212 (2013);

Li et al; "Investigation on terahertz parametric oscillators using GaP crystal with a noncollinear phase-matching scheme"; Journal of Modern Optics Vol. 62, No. 4, p. 302 (2015);

Vodopyanov et al; "Resonantly-enhanced THz-wave generation via multispectral mixing inside a ring-cavity optical parametric oscillator"; *Conference on Lasers and Electro-Optics/International Quantum Electronics Conference*, OSA Technical Digest (Optical Society of America, 2009), CLEO paper CTuG1;

Kokabee et al; "Efficient, high-power, 16-GHz, picosecond optical parametric oscillator pumped by an 81-MHz fiber laser"; *Conference on Lasers and Electro-Optics/Interna-* tional *Quantum Electronics Conference*, OSA Technical Digest (Optical Society of America, 2010), CLEO paper CThP2;

Hurlbut et al; "THz-wave generation inside a high-finesse ring-cavity OPO pumped by a fiber laser"; *Conference on Lasers and Electro-Optics/International Quantum Electronics Conference*, OSA Technical Digest (Optical Society of America, 2010), CLEO paper CWF3; and Creeden et al., "Compact, high average power, fiber-pumped terahertz source for active real-time imaging of concealed objects", Optics Express Vol. 15, No. 10, p. 6478 (2007).

SUMMARY

An optical resonator comprises two or more mirrors and is arranged so as to support one or more resonant optical modes at a specified signal wavelength. A nonlinear optical medium is positioned within the resonator and is optically pumped with pump radiation at a specified pump wavelength; the pump radiation is substantially collinear with the one or more resonant optical modes in the nonlinear optical medium. The nonlinear optical medium is arranged so as to provide, when pumped with the pump radiation, optical parametric gain for (i) signal radiation, at the specified signal wavelength, in the one or more resonant optical modes, and (ii) idler radiation, at a specified idler wavelength, that is substantially collinear with the one or more resonant optical modes. The nonlinear optical medium is further arranged so that the specified idler wavelength corresponds to an idler frequency, which corresponds to a difference frequency between the pump wavelength and the signal wavelength, between about 0.3 THz and about 10 THz. The nonlinear optical medium is pumped with the pump radiation to generate signal radiation and idler radiation.

In some examples the pump radiation is a train of pump pulses and the optical resonator is arranged to be synchronously pumped by the pump pulse train. In some examples the optical resonator is singly resonant (i.e., arranged so as to support optical modes at only the signal wavelength); in other examples the optical resonator is doubly resonant (i.e., arranged so as to support optical modes at both pump and signal wavelengths).

Objects and advantages pertaining to optical parametric oscillators and terahertz generation may become apparent upon referring to the example embodiments illustrated in the drawings and disclosed in the following written description or appended claims.

This Summary is provided to introduce a selection of concepts in a simplified, abbreviated form that are further described below in the Detailed Description. This Summary is not intended to identify key features or essential features of the claimed subject matter, nor is it intended to be used as an aid in determining the scope of the claimed subject matter.

Figure 1A:
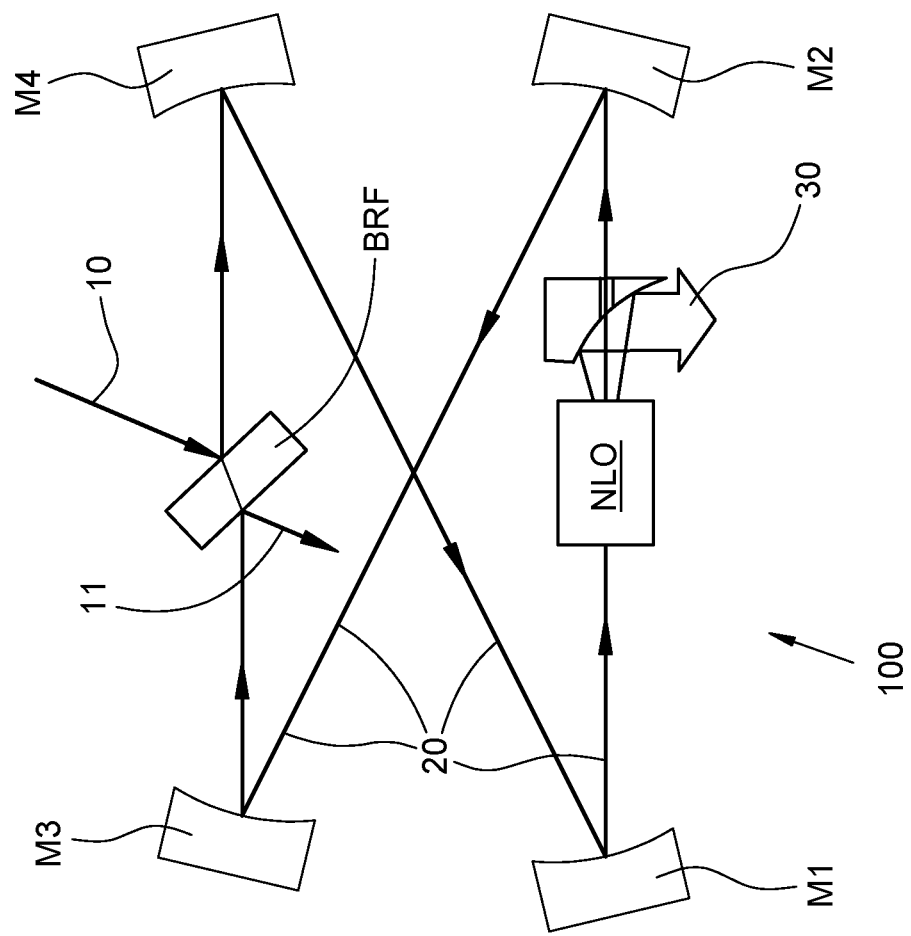
FIG. 1A illustrates schematically a first example of a singly resonant OPO arranged for generating terahertz idler radiation.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

An optical resonator comprises two or more mirrors and is arranged so as to support one or more resonant optical modes at a specified signal wavelength $\lambda_S$. An optical resonator can include any suitable number of two or more mirrors and can be arranged as a ring or linear resonator cavity (the illustrated example embodiments are ring cavities; linear cavities, i.e., standing-wave cavities, also fall within the scope of the present disclosure or appended claims). A nonlinear optical medium (NLO) is positioned within the resonator and is optically pumped with pump radiation at a specified pump wavelength $\lambda_P$; the pump radiation is substantially collinear with the one or more resonant optical modes in the nonlinear optical medium. The nonlinear optical medium is arranged (e.g., via critical or non-critical phase-matching, or quasi-phase-matching) so as to provide, when pumped with the pump radiation at $\lambda_P$, optical parametric gain for (i) signal radiation, at the specified signal wavelength $\lambda_S$ (tunable over a signal tuning range), in the one or more resonant optical modes, and (ii) idler radiation, at a specified idler wavelength $\lambda_I$, that is substantially collinear with the one or more resonant optical modes. The specified idler wavelength $\lambda_I$ corresponds to an idler frequency $v_I$ (with $v_I \equiv c/\lambda_I$) which corresponds to a difference frequency between the pump wavelength $\lambda_P$ and the signal wavelength $\lambda_S$; expressed differently, $1/\lambda_P = 1/\lambda_S + 1/\lambda_I$. Optical pumping of the nonlinear optical medium with the pump radiation at $\lambda_P$ results in generation of signal radiation and idler radiation in the nonlinear optical medium and resonant oscillation in the optical resonator at the signal wavelength $\lambda_S$.

The nonlinear optical medium is further arranged so that the idler frequency vi (equivalently, the terahertz output frequency $v_{THz}$) is between about 0.3 THz and about 10 THz; in some examples $v_{THz}$ is between about 0.5 THz and about 5 THz; in some of those examples $v_{THz}$ is between about 1.0 THz and about 3.0 THz; in other examples other suitable idler tuning ranges can be employed. In some examples, the pump wavelength $\lambda_P$ is between about 0.4 µm and about 2.5 µm; in some of those examples, $\lambda_P$ is between about 1.0 µm and about 1.1 µm; a common pump wavelength is $\lambda_P = 1.064$ µm (i.e., 1064 nm); in other examples other suitable pump wavelengths can be employed. For a pump wavelength $\lambda_P$ of 1064 nm: a range of $v_{THz}$ from about 0.3 THz and about 10 THz corresponds to a signal tuning range of $\lambda_S$ from about 1063 nm to about 1027 nm; a range of $v_{THz}$ from between about 0.5 THz and about 5 THz corresponds to a signal tuning range of $\lambda_S$ from about 1062 nm to about 1045 nm; and a range of $v_{THz}$ from between about 1.0 THz and about 3.0 THz corresponds to a signal tuning range of $\lambda_S$ from about 1060 nm to about 1052 nm. The terahertz output frequency $v_{THz}$ can be tuned by tuning the signal wavelength $\lambda_S$ that resonates in the optical resonator cavity. Over a suitably narrow tuning range, any suitable or conventional intracavity tuning element can be employed; a birefringent filter is a common example. For a sufficiently wide tuning range, different nonlinear optical media might be needed for different portions of the tuning range, e.g., to provide suitable phase-matching or quasi-phase-matching conditions. The different nonlinear optical media can be provided as separate, interchangeable elements, or as distinct spatial regions of a single, monolithic element.

The novel collinear arrangement of the pump, (resonant) signal, and (terahertz) idler radiation in the nonlinear optical medium within the OPO cavity can provide increased levels of terahertz output power. The collinear geometry in a QPM nonlinear optical medium provides an increased interaction length for the pump, signal, and idler waves in the nonlinear optical medium. Substantial absence of spatial beam walk-off in a QPM nonlinear optical medium can facilitate use of such an increased interaction length.

Figure 1B:
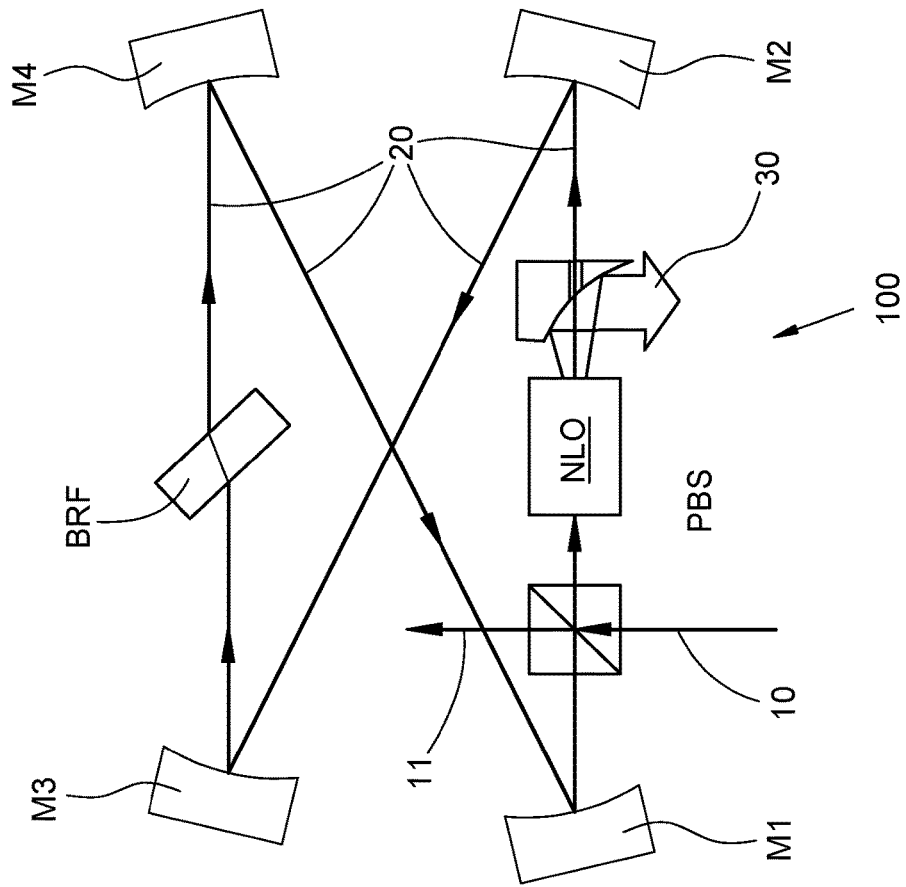
FIG. 1B illustrates schematically a second example of a singly resonant OPO arranged for generating terahertz idler radiation.

FIGS. 1A and 1B illustrate schematically an example of a singly resonant optical parametric oscillator (OPO). In the example of FIGS. 1A and 1B, four mirrors M1, M2, M3, and M4 define a ring optical resonator 100, which supports one or more optical modes 20 at signal wavelengths $\lambda_S$ within a selected signal tuning range. Each of the mirrors M1, M2, M3, and M4 can be flat or curved in any suitable combination or arrangement for supporting the resonant optical modes 20. A nonlinear optical medium (NLO) is positioned within the resonator 100 and is optically pumped with pump radiation at a specified pump wavelength $\lambda_P$ (e.g., via incident pump beam 10). The pump radiation in the nonlinear optical medium is substantially collinear with one or more resonant optical modes supported by the optical resonator 100. Optical pumping of the nonlinear optical medium with the pump radiation at $\lambda_P$ results in generation of substantially collinear signal and idler radiation in the nonlinear optical medium and resonant oscillation in the optical resonator at the signal wavelength $\lambda_S$ in one or more of the resonant optical modes 20. Of the three wavelengths $\lambda_P$, $\lambda_S$, and $\lambda_I$ present in the resonator 100 in the examples of FIGS. 1A and 1B, only signal radiation at $\lambda_S$ undergoes resonant oscillation in the resonator cavity 100, i.e., the resonator 100 is arranged as a singly resonant OPO. The mirrors M1, M2, M3, and M4 are highly reflective at the signal wavelength $\lambda_S$ and the pump wavelength $\lambda_P$. A birefringent filter (BRF) is employed in this example to control the wavelength $\lambda_S$ of the signal radiation resonating in the resonator cavity; in other examples other types of intracavity tuning element can be employed, or the acceptance bandwidth of the nonlinear optical medium can in some cases provide sufficient restriction of the signal wavelength $\lambda_S$. In the example of FIG. 1A, the birefringent filter also serves to couple the orthogonally polarized pump radiation (pump radiation polarized perpendicular to the plane of the figure; signal radiation polarized parallel to the plane of the figure) into the resonator 100 to copropagate through the nonlinear optical medium with the resonant signal radiation; after one cavity round trip the residual pump radiation is directed by the birefringent filter out of the resonator 100 as residual pump beam 11. In other examples other suitable optical elements can be employed to direct the pump radiation through the nonlinear optical medium, e.g., a polarizing beamsplitter (PBS; as in FIG. 1B) in examples wherein the pump and signal are orthogonally polarized, or a dichroic beamsplitter (not shown) in examples wherein the pump and signal have sufficient wavelength separation.

Figure 2:
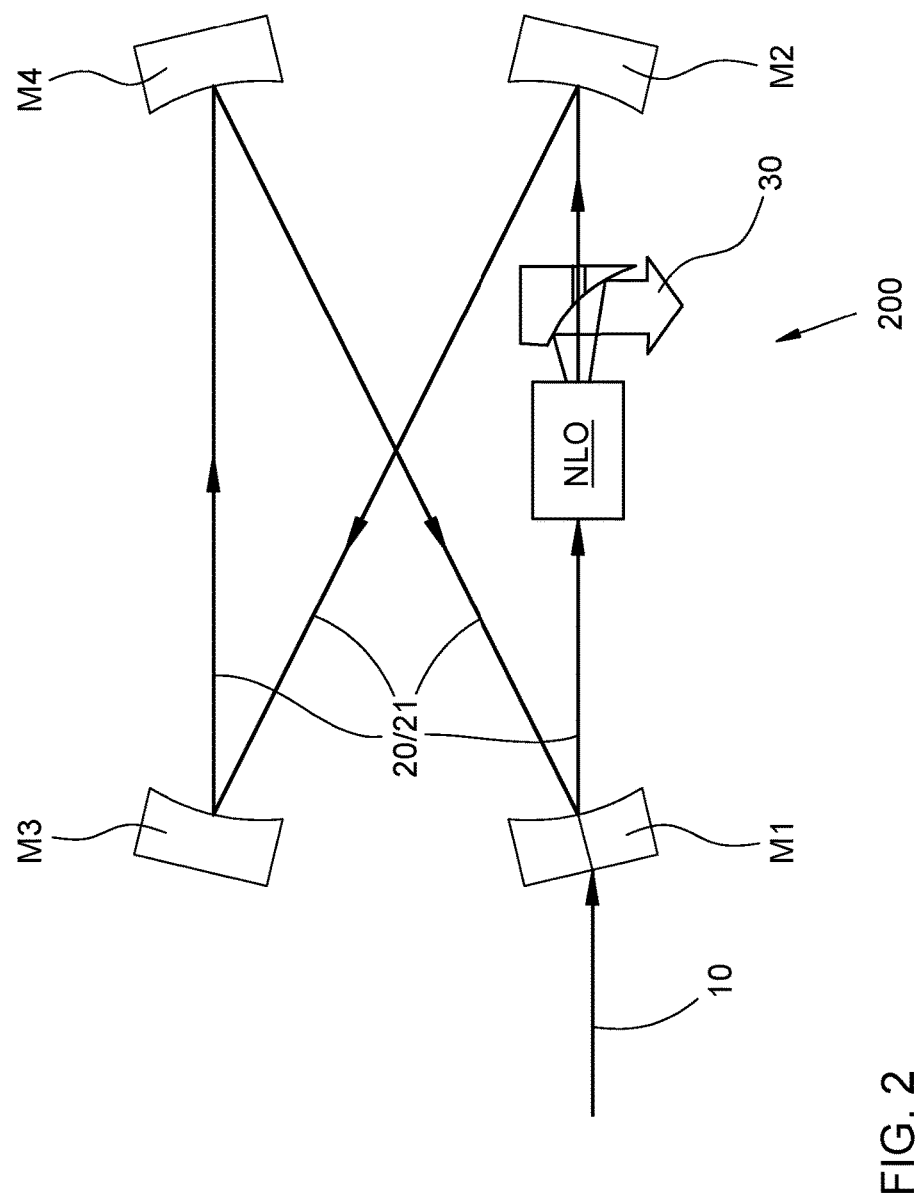
FIG. 2 illustrates schematically an example of a doubly resonant OPO arranged for generating terahertz idler radiation.

FIG. 2 illustrates schematically an example of a doubly resonant optical parametric oscillator (OPO). In the example of FIG. 2, four mirrors M1, M2, M3, and M4 define a ring optical resonator 200, which supports one or more optical modes 20 at signal wavelengths $\lambda_S$ within a selected signal tuning range, as well as one or more optical modes 21 at the specified pump wavelength $\lambda_P$. Each of the mirrors M1, M2, M3, and M4 can be flat or curved in any suitable combination or arrangement for supporting the resonant optical modes 20 and 21. A nonlinear optical medium (NLO) is positioned within the resonator 200 and is optically pumped with pump radiation at the pump wavelength $\lambda_P$ (e.g., via pump beam 10 in FIG. 2). The pump radiation in the nonlinear optical medium is substantially collinear with one or more resonant optical modes 20 and 21 supported by the optical resonator 200. Optical pumping of the nonlinear optical medium with the pump radiation at $\lambda_P$ results in generation of substantially collinear signal and idler radiation in the nonlinear optical medium and resonant oscillation in the optical resonator at the signal wavelength $\lambda_S$. The resonator 200 is also arranged to support resonant build-up of intracavity optical power at the pump wavelength $\lambda_P$, so that the resonator 200 is arranged as a doubly resonant OPO. Because both wavelengths $\lambda_P$ and $\lambda_S$ resonate in this example, an intracavity tuning element typically cannot be employed; the acceptance bandwidth of the nonlinear optical medium would typically be relied upon to provide sufficient restriction of the signal wavelength $\lambda_S$. The mirrors M2, M3, and M4 are highly reflective at the signal wavelength $\lambda_S$ and the pump wavelength $\lambda_P$, while the mirror M1 is slightly transmissive at $\lambda_P$ (e.g., between about 90% and about 99% reflectivity) to couple pump radiation into the resonant cavity 200 and permit resonant build-up of intracavity power at $\lambda_P$ (prevented in the previous examples by the birefringent filter or the polarizing beamsplitter, together with the orthogonal polarization of the pump radiation). A feedback mechanism may be needed to be operatively coupled to the optical resonator 200 for matching the cavity resonances to the pump wavelength so as to maintain at least a selected level of intracavity optical power at the pump wavelength $\lambda_P$; otherwise most of the pump radiation simply reflects off the backside of mirror M1. Any suitable feedback scheme can be employed, e.g., the Hänsch-Couilliaud technique (Hänsch et al, Optics Comm. 35, 441-444 (1980)) or the Pound-Drever-Hall technique (Dreyer et al, Appl. Phys. B: Photophys. Laser Chem. 31, 97-105 (1983)). The intracavity power level at $\lambda_P$ should be at least as large as the incident pump power, and may be several times larger in some examples (e.g., 10 times larger). The pump and signal need not be orthogonally polarized in the Example of FIG. 2; the polarizations can be parallel or orthogonal as needed or desired to satisfy phase-matching or quasi-phase-matching conditions in the nonlinear optical medium.

Once generated in the nonlinear optical medium in the optical resonator, the terahertz radiation (i.e., the idler radiation) must be directed out of the resonator. An optical component can be arranged for that purpose. In the examples of FIGS. 1A, 1B, and 2, an off-axis parabolic reflector M5 is positioned in the optical resonator 100/200 and arranged so as to (i) direct out of the optical resonator the idler radiation (terahertz beam 30) generated within the nonlinear optical medium, and (ii) transmit substantially unattenuated the one or more resonant optical modes (20 or 21). In a typical example, the parabolic reflector M5 has a small aperture positioned to enable the optical modes supported by the resonator 100/200 to pass substantially unattenuated. The presence of such a hole has little or no effect on the amount or quality of the terahertz radiation coupled out of the resonator.

In many examples the pump radiation comprises a pump pulse train and the optical resonator is arranged so as to act as a synchronously pumped optical parametric oscillator, i.e., the optical resonator is arranged so that its cavity round trip time substantially matches the pulse repetition rate of the pump pulse train. In some examples the pump pulse train is characterized by average power greater than about 3 W, pulse repetition rate between about 50 MHz and about 150 MHz, and pulse duration between about 2 picoseconds (full width at half maximum intensity, or FWHM) and about 20 picoseconds FWHM; in some of those examples the pump pulse train is characterized by average power greater than about 5 W, pulse repetition rate between about 70 MHz and about 120 MHz, and pulse duration between about 5 picoseconds FWHM and about 10 picoseconds FWHM; in other examples the pump pulse train can be characterized by other average powers, other pulse repetition rates, or other pulse durations. Any suitable laser source can be employed for providing the pump pulse trains; one example comprises a modelocked, amplified fiber laser.

Any suitable nonlinear optical medium can be employed. A suitable nonlinear optical medium must have sufficiently high optical transmission at the signal wavelength so as to permit resonant oscillation in the resonator 100/200, and exhibit sufficiently high parametric gain when pumped at the pump wavelength. A single-crystal medium can be employed that can be critically or non-critically phase matched (e.g., by angle, temperature, or otherwise) at the desired pump, signal, and idler wavelengths, or that exhibits a sufficiently long coherence length at those wavelengths. Alternatively, the nonlinear optical medium can be arranged so as to exhibit quasi-phase-matched (QPM) optical parametric gain at the specified signal and idler wavelengths, described in several of the references listed above. Examples of QPM nonlinear optical media include periodically poled organic or inorganic media, orientation-patterned semiconductors, or stacks of multiple optically contacted or diffusion-bonded plates. Examples of suitable nonlinear optical materials can include, but are not limited to: one or more of gallium arsenide or gallium phosphide or other III-V semiconductors or alloys thereof; one or more II-VI semiconductors or alloys thereof; one or more of OH1 (2-(3-(4 hydroxystyryl)-5,5-dimethylcyclohex-2-enylidene) malononitrile) or DAST (4-N,N-dimethylamino-4'-N'-methyl-stilbazolium tosylate) or DSTMS (4-N,N-dimethylamino-4'-N'-methyl-stilbazolium 2,4,6-trimethylbenzenesulfonate) or other organic material; potassium or lithium niobate or other inorganic material; or other suitable nonlinear optical materials. Orientation-patterned GaP can be advantageously employed for generating terahertz idler radiation using pump radiation between about 1.0 μm and about 1.1 μm.

In addition to the preceding, the following examples fall within the scope of the present disclosure or appended claims:

Example 1

An apparatus comprising: (a) an optical resonator comprising two or more mirrors and arranged so as to support one or more resonant optical modes at a specified signal wavelength; and (b) a nonlinear optical medium positioned within the resonator and arranged so as to provide optical parametric gain, when optically pumped with pump radiation, at a specified pump wavelength, that is substantially collinear with the one or more resonant optical modes in the nonlinear optical medium, for (i) signal radiation, at the specified signal wavelength, in the one or more resonant optical modes, and (ii) idler radiation, at a specified idler wavelength, that is substantially collinear with the one or more resonant optical modes, (c) wherein the nonlinear optical medium is further arranged so that the specified idler wavelength corresponds to an idler frequency, which corresponds to a difference frequency between the pump wavelength and the signal wavelength, between about 0.3 THz and about 10 THz.

Example 2

The apparatus of Example 1 wherein the idler frequency is greater than about 0.5 THz, greater than about 1.0 THz, less than about 3.0 THz, or less than about 5.0 THz.

Example 3

The apparatus of any one of Examples 1 or 2 wherein the optical resonator is arranged as a ring cavity or as a linear cavity.

Example 4

The apparatus of any one of Examples 1 through 3 further comprising an optical component arranged so as to direct out of the optical resonator idler radiation generated at the specified idler wavelength within the nonlinear optical medium.

Example 5

The apparatus of Example 4 wherein the optical component comprises an off-axis parabolic reflector positioned in the optical resonator and arranged so as to (i) direct out of the optical resonator the idler radiation generated within the nonlinear optical medium, and (ii) transmit substantially unattenuated the one or more resonant optical modes.

Example 6

The apparatus of any one of Examples 1 through 5 wherein the optical resonator is further arranged so as to support one or more resonant optical modes at the specified pump wavelength.

Example 7

The apparatus of Example 6 further comprising a feedback mechanism operatively coupled to the optical resonator so as to maintain at least a selected level of intracavity optical power at the pump wavelength in one or more of the resonant optical modes when optically pumped with the pump radiation.

Example 8

The apparatus of Example 7 wherein the selected level of intracavity power is about 10 times a power level of the pump radiation.

Example 9

The apparatus of any one of Examples 1 through 8 further comprising an intracavity tuning element positioned in the optical resonator and arranged so as to tune the signal wavelength over a signal tuning range.

Example 10

The apparatus of any one of Examples 1 through 9 further comprising an optical element arranged so as to direct the pump radiation through the nonlinear optical medium.

Example 11

The apparatus of any one of Examples 1 through 10 further comprising an intracavity birefringent filter positioned in the optical resonator and arranged so as to tune the signal wavelength over a signal tuning range and to direct the pump radiation through the nonlinear optical medium.

Example 12

The apparatus of any one of Examples 1 through 11 wherein the pump wavelength is greater than about 0.4 µm, greater than about 1.0 µm, less than about 1.1 µm, or less than about 2.5 µm.

Example 13

The apparatus of any one of Examples 1 through 12 wherein the pump radiation comprises a pump pulse train and the optical resonator is arranged so as to act as a synchronously pumped optical parametric oscillator.

Example 14

The apparatus of Example 13 wherein the pump pulse train is characterized by average power greater than about 3 W, pulse repetition rate between about 50 MHz and about 150 MHz, and pulse duration between about 2 picoseconds FWHM and about 20 picoseconds FWHM.

Example 15

The apparatus of Example 13 wherein the pump pulse train is characterized by average power greater than about 5 W, pulse repetition rate between about 70 MHz and about 120 MHz, and pulse duration between about 5 picoseconds FWHM and about 10 picoseconds FWHM.

Example 16

The apparatus of any one of Examples 1 through 15 wherein the nonlinear optical medium is arranged so as to provide the optical parametric gain for signal radiation polarization that is substantially orthogonal to pump radiation polarization.

Example 17

The apparatus of any one of Examples 1 through 16 wherein the nonlinear optical medium is arranged so as to exhibit critically or non-critically phase-matched optical parametric gain at the specified signal and idler wavelengths.

Example 18

The apparatus of any one of Examples 1 through 16 wherein the nonlinear optical medium is arranged so as to exhibit quasi-phase-matched optical parametric gain at the specified signal and idler wavelengths.

Example 19

The apparatus of Example 18 wherein the nonlinear optical medium comprises an orientation-patterned semiconductor, a stack of multiple optically contacted or diffusion-bonded plates, or a periodically poled organic or inorganic material.

Example 20

The apparatus of any one of Examples 1 through 19 wherein the nonlinear optical medium comprises one or more of GaP, GaAs, one or more III-V semiconductors or alloys thereof, one or more II-VI semiconductor or an alloy thereof, potassium niobate, lithium niobate, other inorganic material, OH1, DAST, DSTMS, or other organic material.

Example 21

A method performed using the apparatus of any one of Examples 1 through 20, the method comprising optically pumping, with the pump radiation at the specified pump wavelength, the nonlinear optical medium positioned within the optical resonator, thereby generating the signal radiation and the idler radiation that are substantially collinear with the pump radiation in the nonlinear optical medium, wherein the idler frequency is between about 300 GHz and about 10 THz.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or"

would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an example or claim (e.g., first, second, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the example or claim or, in some instances, it will be implicit or inherent based on the specific content of the example or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus comprising:
    (a) an optical resonator comprising two or more mirrors and arranged so as to support one or more resonant optical modes at a specified signal wavelength; and
    (b) a nonlinear optical medium positioned within the resonator and arranged so as to provide optical parametric gain, when optically pumped with pump radiation, at a specified pump wavelength, that is substantially collinear with the one or more resonant optical modes in the nonlinear optical medium, for (i) signal radiation, at the specified signal wavelength, in the one or more resonant optical modes, and (ii) idler radiation, at a specified idler wavelength, that is substantially collinear with the one or more resonant optical modes,
    (c) wherein the nonlinear optical medium is further arranged so that the specified idler wavelength corresponds to an idler frequency, which corresponds to a difference frequency between the pump wavelength and the signal wavelength, between about 0.3 THz and about 10 THz.

2. The apparatus of claim 1 further comprising an optical component arranged so as to direct out of the optical resonator idler radiation generated at the specified idler wavelength within the nonlinear optical medium.

3. The apparatus of claim 2 wherein the optical component comprises an off-axis parabolic reflector positioned in the optical resonator and arranged so as to (i) direct out of the optical resonator the idler radiation generated within the nonlinear optical medium, and (ii) transmit substantially unattenuated the one or more resonant optical modes.

4. The apparatus of claim 1 wherein the optical resonator is further arranged so as to support one or more resonant optical modes at the specified pump wavelength.

5. The apparatus of claim 4 further comprising a feedback mechanism operatively coupled to the optical resonator so as to maintain at least a selected level of intracavity optical power at the pump wavelength in one or more of the resonant optical modes when optically pumped with the pump radiation.

6. The apparatus of claim 1 further comprising an intracavity tuning element positioned in the optical resonator and arranged so as to tune the signal wavelength over a signal tuning range.

7. The apparatus of claim 1 further comprising an optical element arranged so as to direct the pump radiation through the nonlinear optical medium.

8. The apparatus of claim 1 further comprising an intracavity birefringent filter positioned in the optical resonator and arranged so as to tune the signal wavelength over a signal tuning range and to direct the pump radiation through the nonlinear optical medium.

9. The apparatus of claim 1 wherein the pump wavelength is between about 1.0 µm and about 1.1 µm.

10. The apparatus of claim 1 wherein the pump radiation comprises a pump pulse train and the optical resonator is arranged so as to act as a synchronously pumped optical parametric oscillator.

11. The apparatus of claim 10 wherein the pump pulse train is characterized by average power greater than about 5 W, pulse repetition rate between about 70 MHz and about 120 MHz, and pulse duration between about 5 picoseconds FWHM and about 10 picoseconds FWHM.

12. The apparatus of claim 1 wherein the nonlinear optical medium is arranged so as to exhibit quasi-phase-matched optical parametric gain at the specified signal and idler wavelengths.

13. The apparatus of claim 12 wherein the nonlinear optical medium comprises an orientation-patterned semiconductor, a stack of multiple optically contacted or diffusion-bonded plates, or a periodically poled organic or inorganic material.

14. The apparatus of claim 1 wherein the nonlinear optical medium comprises GaP, GaAs, one or more III-V semiconductors, or one or more alloys of one or more III-V semiconductors.

15. A method comprising optically pumping, with pump radiation at a specified pump wavelength, a nonlinear optical medium positioned within an optical resonator, thereby generating signal radiation and idler radiation that are substantially collinear with the pump radiation in the nonlinear optical medium, wherein:
  (a) the optical resonator comprises two or more mirrors and is arranged so as to support one or more resonant optical modes at a specified signal wavelength;
  (b) the nonlinear optical medium is arranged so as to provide optical parametric gain, when optically pumped with pump radiation, at a specified pump wavelength, that is substantially collinear with the one or more resonant optical modes in the nonlinear optical medium, for (i) signal radiation in the one or more resonant optical modes, and (ii) idler radiation that is substantially collinear with the one or more resonant optical modes; and
  (c) the nonlinear optical medium is further arranged so that the specified idler wavelength corresponds to an idler frequency, which corresponds to a difference frequency between the pump wavelength and the signal wavelength, between about 300 GHz and about 10 THz.

16. The method of claim 15 further comprising directing out of the optical resonator idler radiation generated at the specified idler wavelength within the nonlinear optical medium.

17. The method of claim 15 wherein the optical resonator is further arranged so as to support one or more resonant optical modes at the specified pump wavelength, the method further comprising, using a feedback mechanism operatively coupled to the optical resonator, maintaining at least a selected level of intracavity optical power at the pump wavelength in one or more of the resonant optical modes when optically pumped with the pump radiation.

18. The method of claim 15 further comprising, using an intracavity tuning element positioned in the optical resonator, tuning the signal wavelength over a signal tuning range.

19. The method of claim 15 wherein the pump wavelength is between about 1.0 µm and about 1.1 µm.

20. The method of claim 15 wherein the pump radiation comprises a pump pulse train and the optical resonator is arranged so as to act as a synchronously pumped optical parametric oscillator.

21. The method of claim 20 wherein the pump pulse train is characterized by average power greater than about 5 W, pulse repetition rate between about 70 MHz and about 120 MHz, pulse duration between about 5 picoseconds FWHM and about 10 picoseconds FWHM.

* * * * *